United States Patent
Singh

(10) Patent No.: US 10,410,756 B2
(45) Date of Patent: Sep. 10, 2019

(54) CONTAINER FOR STORING AND/OR TRANSPORTING SPENT NUCLEAR FUEL

(71) Applicant: Holtec International, Camden, NJ (US)

(72) Inventor: Krishna P. Singh, Hobe Sound, FL (US)

(73) Assignee: HOLTEC INTERNATIONAL

( * ) Notice: Subject to any disclaimer, the term of this patent is extended or adjusted under 35 U.S.C. 154(b) by 158 days.

(21) Appl. No.: 15/639,332

(22) Filed: Jun. 30, 2017

(65) Prior Publication Data

US 2018/0005718 A1  Jan. 4, 2018

Related U.S. Application Data

(60) Provisional application No. 62/357,603, filed on Jul. 1, 2016.

(51) Int. Cl.
*G21F 5/06* (2006.01)
*G21F 5/14* (2006.01)

(52) U.S. Cl.
CPC . *G21F 5/06* (2013.01); *G21F 5/14* (2013.01)

(58) Field of Classification Search
CPC ..... G21F 5/06; G21F 5/08; G21F 5/14; B66C 1/223; B66C 1/28; B66C 1/66; B66C 1/663; B65D 88/12; B65D 88/56; B65D 90/0033
USPC .............................................. 294/68.1, 68.27
See application file for complete search history.

(56) References Cited

U.S. PATENT DOCUMENTS

| 4,336,460 A | 6/1982 | Best et al. |
| 5,056,408 A * | 10/1991 | Joner ............... F42B 10/38 |
| | | 102/382 |
| 5,406,600 A | 4/1995 | Jones et al. |
| 5,513,231 A | 4/1996 | Jones et al. |
| 5,513,232 A | 4/1996 | Jones et al. |
| 5,546,436 A | 8/1996 | Jones et al. |

(Continued)

FOREIGN PATENT DOCUMENTS

| DE | 3015553 | 10/1981 |
| FR | 2968822 | 6/2012 |

(Continued)

OTHER PUBLICATIONS

Corresponding European Search Report for EP 17179187 dated Nov. 24, 2017.

(Continued)

*Primary Examiner* — Sharon M Davis
(74) *Attorney, Agent, or Firm* — The Belles Group, P.C.

(57) ABSTRACT

A container for storing and/or transporting spent nuclear fuel. The container includes a body that defines an internal cavity that holds the spent nuclear fuel and an outer surface. The outer surface has holes formed therein into which trunnions are positioned. The container can be lifted by a lift yoke by coupling the lift yoke to the trunnions. The trunnions may include first and second components such that the first component is slidable in its axial direction relative to the second component when a force that exceeds a threshold acts on the second component. Thus, the second component may be slidable between a protruded state in which a portion of the second component protrudes from the outer surface of the body and a retracted state in which the second component does not protrude from the outer surface of the body.

20 Claims, 13 Drawing Sheets

(56) References Cited

U.S. PATENT DOCUMENTS

| | | | |
|---|---|---|---|
| 6,724,853 B2 | 4/2004 | Gluschke et al. |
| 2008/0031397 A1 | 2/2008 | Singh et al. |
| 2013/0045070 A1 | 2/2013 | Waisanen et al. |
| 2015/0092904 A1 | 4/2015 | Carver et al. |
| 2016/0005501 A1 | 1/2016 | Singh et al. |

FOREIGN PATENT DOCUMENTS

| | | |
|---|---|---|
| JP | 2011058845 | 3/2011 |
| WO | 2014117082 | 7/2014 |

OTHER PUBLICATIONS

Corresponding International Search Report and Written Opinion for PCT/US2017/040357 dated Sep. 14, 2017.

* cited by examiner

CONTAINER FOR STORING AND/OR TRANSPORTING SPENT NUCLEAR FUEL

CROSS-REFERENCE TO RELATED PATENT APPLICATIONS

The present application claims the benefit of U.S. Provisional Patent Application Ser. No. 62/357,603, filed Jul. 1, 2016, the entirety of which is hereby incorporated by reference.

FIELD OF THE INVENTION

The present invention relates generally to a container for storing and/or transporting spent nuclear fuel, and more specifically to such a container having a collapsible trunnion or lifting lug.

BACKGROUND OF THE INVENTION

Heavy casks containing hazardous materials such as high level nuclear waste and fissile materials are typically handled by a set of trunnions. The trunnions are generally made of a cylindrical bar stock welded to a hard location near the top of the cask. The trunnion must project out sufficiently to provide an engagement shoulder for a lift yoke to engage it. This projection, however, is a problem where the cask must be designed to withstand a free fall event such as that required for transport casks containing used nuclear fuel. The federal regulations and the IAEA standards require the cask to be qualified under a free fall event from a height of 30 feet onto an essentially unyielding surface under any orientation of impact. In such a case, the cask may be equipped with an impact limiter at each extremity to absorb the kinetic energy of impact by crushing. The projection of the trunnion, made of a high strength steel or other alloy material, however, interferes with the crushing action of the impact limiter if the impact orientation of the cask is aligned with the plane of the trunnion. The solution to this design problem thus far has been to tap the trunnions and thread them into the cask's flange. The trunnion is removed when not in use to eliminate the threat of trunnion penetration during the above-mentioned design basis accident event. This approach has three major shortcomings:
  (1) The threaded joint sometimes freezes under the bending moment from the lifted load making the trunnion's subsequent removal problematic;
  (2) It may not be possible to handle the cask without the trunnions in place (after all, their sole purpose is to enable cask's handling); and
  (3) The trunnions are restricted to be located in the neck of the cask so that its projection beyond the cask's body is minimized.

The above limitations make the conventional trunnion design a rather unsatisfactory embodiment. Thus, a need exists for a trunnion design that overcomes the aforementioned deficiencies.

SUMMARY OF THE INVENTION

The present invention, in one aspect, is a container for storing and/or transporting spent nuclear fuel. The container includes a body that defines an internal cavity that holds the spent nuclear fuel and an outer surface. The outer surface has holes formed therein into which trunnions are positioned. The container can be lifted by a lift yoke by coupling the lift yoke to the trunnions. The trunnions may include first and second components such that the first component is slidable in its axial direction relative to the second component when a force that exceeds a threshold acts on the second component. Thus, the second component may be slidable between a protruded state in which a portion of the second component protrudes from the outer surface of the body and a retracted state in which the second component does not protrude from the outer surface of the body.

In one aspect, the invention can be a container for storing and/or transporting spent nuclear fuel comprising: a body having an outer surface and an inner surface defining an internal cavity; a plurality of blind holes formed into the body, each of the blind holes defined by a floor and a sidewall extending from the floor to an opening in the outer surface of the body; a plurality of trunnions coupled to the body, each of the trunnions comprising: a first component located within one of the blind holes, the first component extending from a first end to a second end and having an inner surface defining a hollow interior; and a second component at least partially located within the hollow interior of the first component, the second component extending from a first end to a second end along a longitudinal axis; and wherein for each of the plurality of trunnions, the second component is axially slidable relative to the first component between: (1) a protruded state in which a portion of the second component protrudes from the outer surface of the body; and (2) a retracted state in which the second component does not protrude from the outer surface of the body In another aspect, the invention can be a container for storing and/or transporting spent nuclear fuel comprising: a body having an outer surface and an inner surface defining an internal cavity configured to hold spent nuclear fuel; a hole formed into the the body, the hole defined by a floor and a sidewall extending from the floor to an opening in the outer surface of the body; a trunnion coupled to the body within the hole, the trunnion comprising: a first component welded to the body within the hole, the first component having a first end that is in contact with the floor of the hole, a second end that is flush with or recessed relative to the outer surface of the body, an outer surface that is in contact with the sidewall of the hole, and an inner surface that defines a hollow interior; and a second component located within the hollow interior of the first component, the second component extending from a first end to a second end along a longitudinal axis, the second component comprising a first portion that is located within the hollow interior of the first component and spaced from the floor of the hole by a gap and a second portion that protrudes from the outer surface of the body; and wherein upon application of an axial force that exceeds a predetermined threshold onto the second end of the second component, the second component slides relative to the first component in an axial direction into the gap In yet another aspect, the invention can be a container for storing and/or transporting spent nuclear fuel comprising: a body having an outer surface and an inner surface defining an cavity; a lid enclosing a top end of the cavity, the lid having a bottom surface facing the cavity and an opposite top surface; at least one lifting lug coupled to the lid, the lifting lug comprising: a first component coupled to the lid and protruding from the top surface of the lid, the first component having a top surface and an inner surface that defines a hollow interior; and a second component coupled to the first component and extending from a first end to a second end along a longitudinal axis, the second component having a first portion located within the hollow interior of the first component and a second portion protruding from the top surface of the first component; and wherein upon application of a compression force that exceeds a predetermined threshold onto the second component, the second component axially slides relative to the first component until a top surface of the second component is flush with or recessed relative to the top surface of the first component.

In a further aspect, the invention can be a container for storing and/or transporting spent nuclear fuel comprising: a body having an outer surface and an inner surface defining an internal cavity; a lid enclosing a top end of the cavity, the lid having a bottom surface facing the cavity and an opposite top surface; at least one lifting lug coupled to the lid, the lifting lug comprising: a first component coupled to the lid and protruding from the top surface of the lid, the first component having an inner surface that defines a hollow interior and a top surface; and a second component coupled to the first component and at least partially located within the hollow interior of the first component, the second component extending from a first end to a second end along a longitudinal axis; and wherein the second component of the lifting lug is axially slidable relative to the first component of the lifting lug between: (1) a protruded state in which a portion of the second component protrudes from the top surface of the first component; and (2) a retracted state in which the second portion of the lifting lug does not protrude from the top surface of the first component of the lifting lug.

In a still further aspect, the invention can be a container for storing and/or transporting spent nuclear fuel comprising: a body having an outer surface and an inner surface defining an internal cavity; a plurality of blind holes formed into the body, each of the blind holes defined by a floor and a sidewall extending from the floor to an opening in the outer surface of the body; a plurality of trunnions, each of the trunnions located within one of the blind holes and extending from a first end to a second end along a longitudinal axis; and wherein at least one of the plurality of trunnions is axially slidable relative to the body between: (1) a protruded state in which a portion of the trunnion protrudes from the outer surface of the body; and (2) a retracted state in which the trunnion does not protrude from the outer surface of the body.

In a yet further aspect, the invention may be a lifting lug comprising: a first component having an inner surface that defines a hollow interior and a top surface; a second component at least partially located within the hollow interior of the first component, the second component extending from a first end to a second end along a longitudinal axis; and wherein the second component of the lifting lug is axially slidable relative to the first component of the lifting lug between: (1) a protruded state in which a portion of the second component protrudes from the top surface of the first component; and (2) a retracted state in which the second portion of the lifting lug does not protrude from the top surface of the first component of the lifting lug.

In another aspect, the invention may be a container for storing and/or transporting spent nuclear fuel comprising: a body having an outer surface and an inner surface defining an internal cavity; a canister containing radioactive materials located in the internal cavity; at least one lifting device coupled to the body; wherein the lifting device is collapsible between: (1) a non-collapsed state; and (2) a collapsed state; and wherein in the non-collapsed state the lifting device protrudes a greater distance from the outer surface of the body than in the non-collapsed state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the preferred embodiments will be described with reference to the following drawings where like elements are labeled similarly, and in which.

DETAILED DESCRIPTION OF THE DRAWINGS

Figure 1:
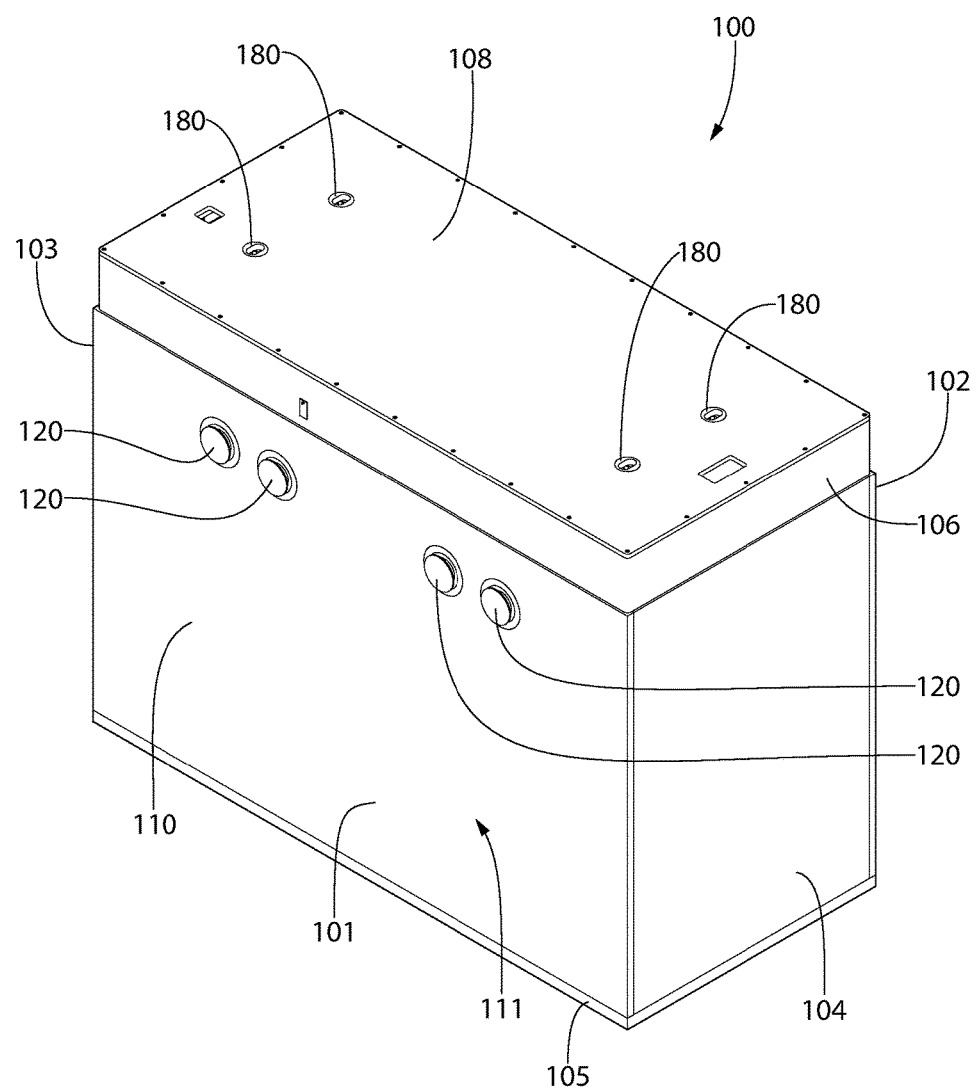
FIG. 1 is a perspective view of a container for storing and/or transporting spent nuclear fuel in accordance with an embodiment of the present invention
Figure 2:
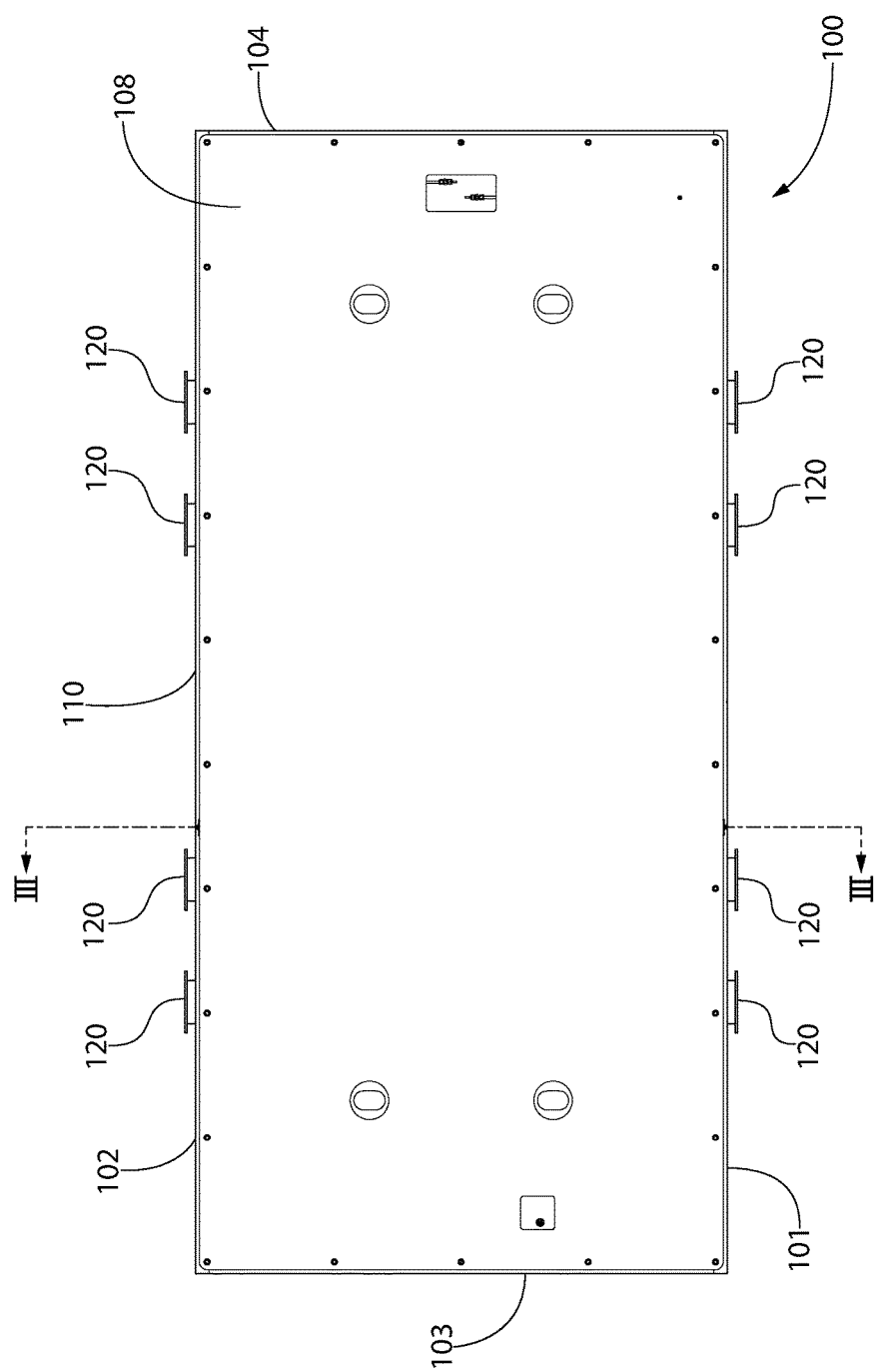
FIG. 2 is a top view of the container of FIG. 1.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring to FIGS. 1-4 concurrently, a container 100 for storing and/or transporting spent nuclear fuel is illustrated according to an embodiment of the present invention. The container 100 may be configured to hold any type of radioactive materials, including radioactive waste such as spent nuclear fuel, nuclear waste, or the like, and also including other types of materials. The container 100 may be a cask that is intended for the dry storage of spent nuclear fuel after the spent nuclear fuel has been cooled in a spent fuel pool to reduce the heat and radiation to a sufficiently low level so that the spent nuclear fuel can be transported with safety. In that regard, in some embodiments the container 100 may be a steel structure that is welded and/or bolted closed that provides a leak-tight confinement of the spent nuclear fuel. The spent nuclear fuel within the container 100 may be surrounded by an inert gas. During long-term storage, the container 100 may be surrounded by additional steel, concrete, or other material to provide radiation shielding to workers and members of the public. The containers 100 described herein are vertical dry storage casks that are intended to be placed vertically in a concrete vault during storage. However, the containers 100 may be of the horizontal type as well. While the container 100 is discussed herein as being used to store spent nuclear fuel, it is to be understood that the invention is not so limited and that, in certain circumstances, the container 100 can be used to transport spent nuclear fuel from location to location if desired. Moreover, the container can be used in combination with any other type of high level radioactive waste such as high level nuclear waste, fissile materials, or the like.

The container 100 may be designed to accept one or more canisters for storage at an Independent Spent Fuel Storage Installation ("ISFSI"). All canister types engineered for the dry storage of spent nuclear fuel can be stored in the container 100. Suitable canisters include multi-purpose canisters ("MPCs") and, in certain instances, can include thermally conductive casks that are hermetically sealed for the dry storage of high level radioactive waste. Typically, such canisters may include a honeycomb basket or other structure to accommodate a plurality of spent nuclear fuel rods in spaced relation.

In the exemplified embodiment, the container 100 comprises a body 110 having an outer surface 111 and an inner surface 112 that defines an internal cavity 113 within which spent nuclear fuel may be contained for storage and/or transport. The internal cavity 113 extends from a bottom end to a top end along a longitudinal axis A-A. In the exemplified embodiment, the body 110 has a rectangular shape formed by a first sidewall 101, a second sidewall 102 that is opposite the first sidewall 101, a third sidewall 103, and a fourth sidewall 104 that is opposite the third sidewall 103. Each of the third and fourth sidewalls 103, 104 extends between the first and second sidewalls 101, 102. The first, second, third, and fourth sidewalls 101-104 collectively form a sidewall of the body 110. Of course, shapes other than rectangular are possible in other embodiments including cylindrical (FIG. 8) and other polygonal/prismatic shapes.

Figure 3:
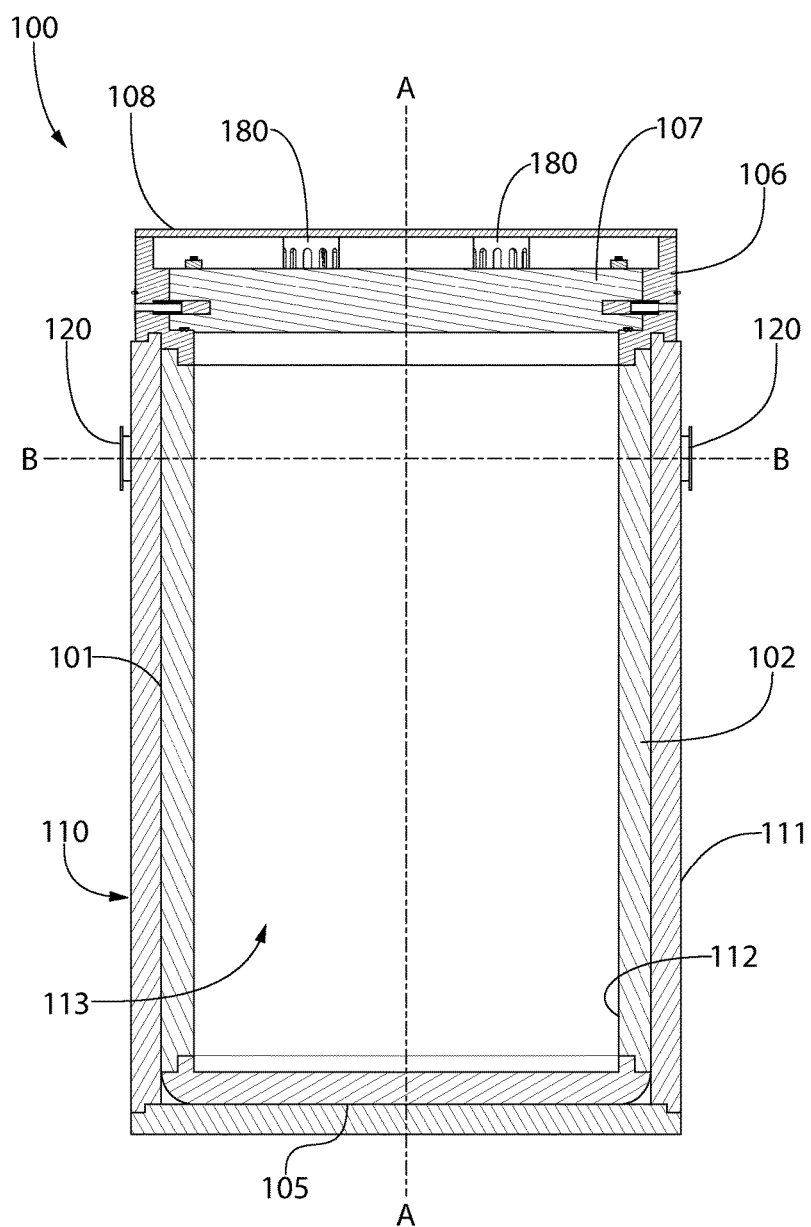
FIG. 3 is a cross-sectional view taken along line III-III of FIG. 2.
Figure 4:
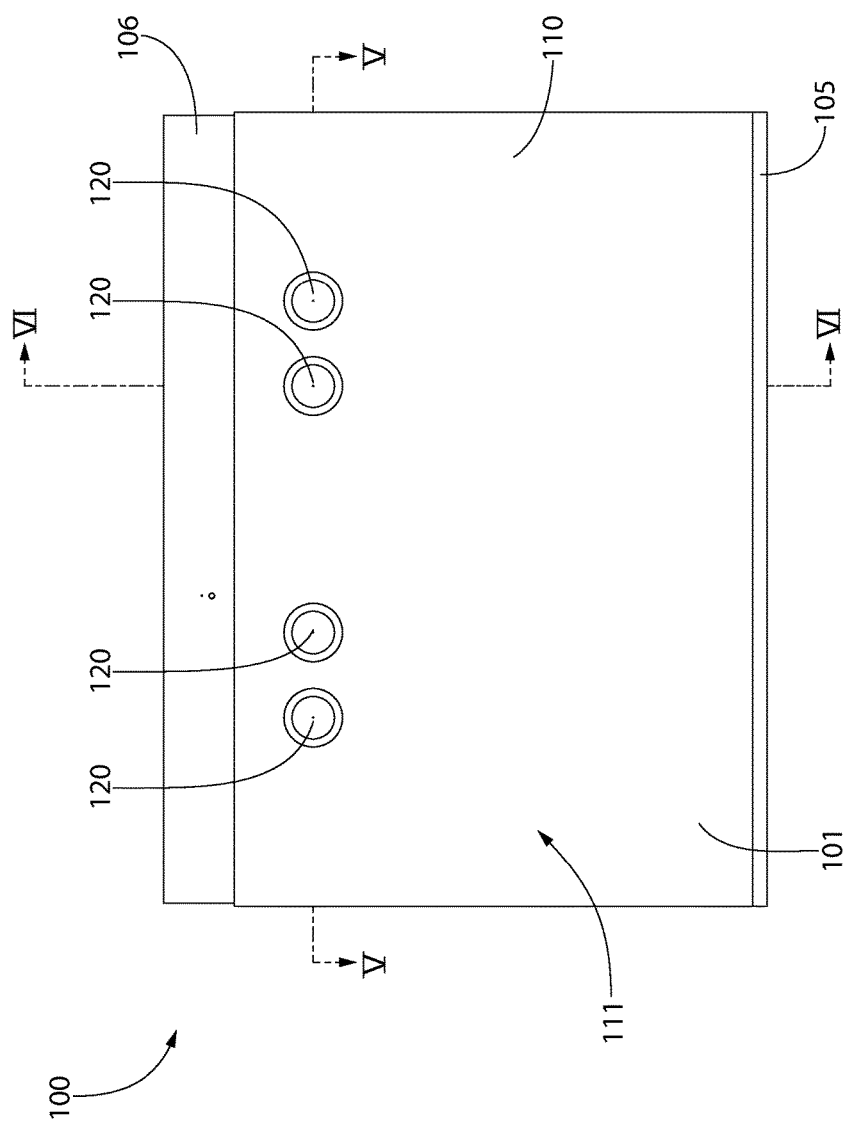
FIG. 4 is a front view of the container of FIG. 1.

Furthermore, the body 110 comprises a base plate 105 that connects to a bottom end of each of the first, second, third, and fourth sidewalls 101-104 and closes a bottom end of the internal cavity 113. The body 110 also comprises a lid flange 106 extending from a top end of each of the first, second, third, and fourth sidewalls 101-104. An outer diameter of the lid flange 106 may be slightly less than an outer diameter of the sidewall as best seen in FIG. 3. A lid 107 is coupled to the lid flange 106 to close a top end of the internal cavity 113. Furthermore, in the exemplified embodiment a cover (also known as a secondary lid) 108 is coupled to a top end of the lid flange 106 above the lid 107.

In the exemplified embodiment, each of the sidewalls 101-104 and the base plate 105 comprises two layers. The inner layer is a wall formed of stainless steel that forms the containment structure of the container 100. The outer layer is a dose blocker plate that may also be formed of stainless steel and may form a secondary containment structure of the container 100. Each of the inner and outer layers may form a distinct hermetically sealed vessel thus providing dual-walled protection against radiation to prevent such radiation from exiting the internal cavity 113 and entering the atmosphere. Although described herein as being formed of stainless steel, the inner and outer layers can be formed of other materials, such as austenitic stainless steel and other metal alloys including Hastelloy™ and Inconel™. The dose blocker plate may include additives or the like for radiation shielding purposes to prevent radiation emanating from the spent nuclear fuel from exiting the internal cavity 113. Of course, in other embodiments the sidewalls 101-104 may have just a single layer. Furthermore, in still other embodiments the sidewalls 101-104 may be formed of concrete or the like instead of stainless steel.

The container 100 also comprises a plurality of trunnions 120 coupled to the body 110. Specifically, in the exemplified embodiment there are four trunnions 120 on the first sidewall 101 and four trunnions 120 on the second sidewall 102. Of course, there may be more or less than four of the trunnions 120 on each of the first and second sidewalls 101, 102 in alternative embodiments. Furthermore, although in the exemplified embodiment there are no trunnions 120 on the third and fourth sidewalls 103, 104, in other embodiments there may be one or more trunnions 120 on the third and fourth sidewalls 103, 104 in addition to or instead of the trunnions 120 on the first and second sidewalls 101, 102. In some embodiments, all of the trunnions 120 are located on one or more of the sidewalls 101-104 and there are no trunnions 120 located on the lid flange 106.

Figure 10:
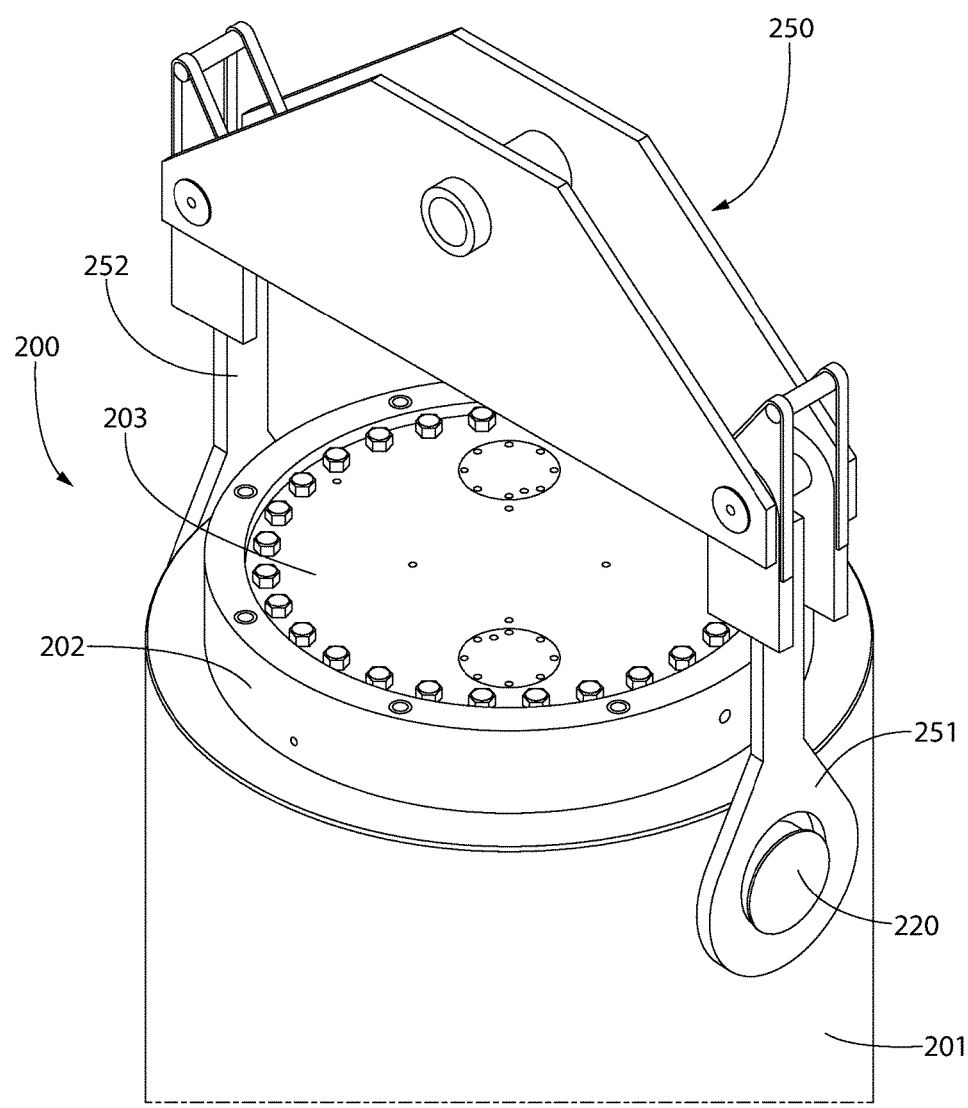
FIG. 10 is the close-up view of FIG. 9 with a lift yoke coupled to the trunnions of the container.

In the exemplified embodiment, each of the trunnions 120 on the first sidewall 101 is aligned with one of the trunnions 120 on the second sidewall 102. More specifically, the trunnions 120 on the first and second sidewalls 101, 102 are aligned along a reference axis B-B that is perpendicular (possibly without intersecting) to the longitudinal axis A-A of the internal cavity 113. Thus, each of the trunnions 120 on the first sidewall 101 is spaced the same distance from the lid 107 and the same distance from the third sidewall 103 as one of the trunnions 120 on the second sidewall 102. The purpose of the trunnions 120 is to enable a lift yoke to engage the portion of the trunnion 120 that protrudes out from the outer surface 111 of the body 110 to transport the container 100. Thus, the lift yoke can raise the container 100 off the ground via engagement between the lift yoke and the trunnions 120 to move the container 100 from one location to another. The lift yoke serves as the interface between a plant crane and the container 100 to maneuver the container 100 as desired. An exemplary lift yoke is illustrated in FIG. 10 and will be described briefly below.

The container 100 is a hermetically sealed apparatus that has no openings or penetrations therein when the lid 107 is coupled to the top ends of the sidewalls 101-104 to close the internal cavity 113. Thus, there is no passageway extending from the internal cavity 113 to the external atmosphere, which is necessary to prevent radiation from entering the atmosphere. In that regard, it is important to ensure that under no circumstances can the trunnions pierce the body 110 and form a passageway into the internal cavity 113. Thus, even if the container 100 were to fall on one of its first or second sidewalls 101, 102, it is important that the contact between the trunnions 120 and the ground or hard surface upon which the container 100 falls does not cause the trunnions 120 to pierce the body 110 or otherwise penetrate the internal cavity 113 of the body. As mentioned in the background, previously this was accomplished by coupling the trunnions to the body via a threaded engagement so that the trunnions could be removed when not being used to maneuver the container 100. However, this conventional technique has disadvantages that are overcome in the present invention whereby the trunnions 120 are formed as a collapsible structure so that during a fall event as described above, the trunnions 120 will collapse into the body 110 of the container 100 rather than piercing the body 110 of the container. Thus, the trunnions 120 need not be removed from the body 110 during periods of non-use because there is no possibility that the trunnions 120 can pierce the body 110 of the container 100 even during an undesirable or unplanned fall or tip-over event.

In the exemplified embodiment, the trunnions 120 are in a protruded state such that a portion of the trunnions 120 extends/protrudes from the outer surface 111 of the body 110. The trunnions 120 must be in the protruded state in order for the lift yoke to be able to engage the trunnions 120 to move the container 100. Specifically, as described below with reference to FIG. 10, the hooks of the lift yoke must be able to be positioned between a flange located at a distal end of the trunnions 120 and the outer surface 111 of the body 110 in order for the lift yoke to lift the container 100 by the trunnions 120. Thus, in normal operation and use of the container 100, the trunnions 120 are in the protruded state.

The trunnions 120 are configured to be alterable from the protruded state to a retracted state whereby the trunnions 120 no longer protrude from the outer surface 111 of the body 110 (see FIGS. 7A and 7B, described in more detail below). The trunnions 120 only move into the retracted state when they are forced into that state, such as by the container 100 tipping over and landing on one of the trunnions 120. Specifically, if the container 100 were to tip over, contact of the trunnions 120 with the ground or some other hard surface combined with the force created by the weight of the container 100 pressing the trunnions 120 into the ground or other hard surface will move the trunnion 120 from the protruded state to the retracted state without causing any damage to the body 110 of the container 100. This is because, as discussed below, the trunnion 120 or a portion thereof will simply slide within a hole in the body 110 from which it extends, as described in more detail below.

When in the retracted state (illustrated in FIG. 7B), the lift yoke is no longer capable of engaging the trunnions 120 because there is no surface area of the trunnions 120 protruding from the outer surface 111 of the body 110 to be engaged by the lift yoke. Thus, when the trunnions 120 are in the retracted state, the container 100 cannot be moved via engagement between the lift yoke and the trunnions 120 due to a lack of an engagement surface on the trunnions 120. As stated above, in certain embodiments the trunnions 120 may collapse from the protruded state into the retracted state upon an axial force being applied onto the portions of the trunnions 120 that are protruding from the outer surface 111 of the body 110. Thus, if there were a tip-over event and the container 100 were to fall onto one of its sidewalls 101-104, the weight of the container 100 against the ground or other hard surface would cause the trunnions 120 to be moved from the protruded state to the retracted state without the trunnions 120 penetrating the inner surface 112 of the body 110. Thus, by forming the trunnions 120 to be collapsible as described herein, the sidewalls 101-104 of the body 110 that have the trunnions 120 thereon are protected from being damaged by the trunnions 120 without ever requiring removal of the trunnions.

Referring to FIGS. 5-7A, the container 100 comprises a plurality of blind holes 115 formed into the outer surface 111 of the body 110. In the exemplified embodiment, the number of blind holes 115 corresponds with the number of trunnions 120 because one of the trunnions 120 is positioned within each of the blind holes 115 and secured to the body 110 within the blind hole 115. Thus, the blind holes 115 are formed into the first and second sidewalls 101, 102 of the body 110 in the exemplified embodiment, but they may be located at any position along the body 110 at which a trunnion 120 is desired to facilitate lifting and maneuvering of the container 100. As will be understood from the description below in conjunction with FIGS. 7A and 7B, the trunnions 120 remain coupled to the body 110, or at least located within the blind hole 115 of the body 110, in both the protruded and retracted states.

Each of the blind holes 115 is defined by a floor 116 and a sidewall 117 extending from the floor 116 to an opening 118 in the outer surface 111 of the body 110. The blind holes 115 do not penetrate the entire thickness of the sidewall of the body 110 in which they are formed but rather extend a distance into the sidewall to the floor 116 of the blind hole 115. A portion of the sidewall of the body 110 remains between the floor 116 of the blind hole 115 and the interior cavity 113 of the body 110. In the exemplified embodiment, the blind holes 115 have a circular cross-sectional shape. However, the shape of the blind holes 115 should correspond with the shape of the trunnions 120 and thus although the blind holes 115 and the trunnions 120 have a circular cross-sectional shape in the exemplified embodiment, this is not required in all embodiments and other prismatic cross-sectional shapes (i.e., triangular, rectangular, or the like) may be used without affecting the function described herein.

Figure 5:
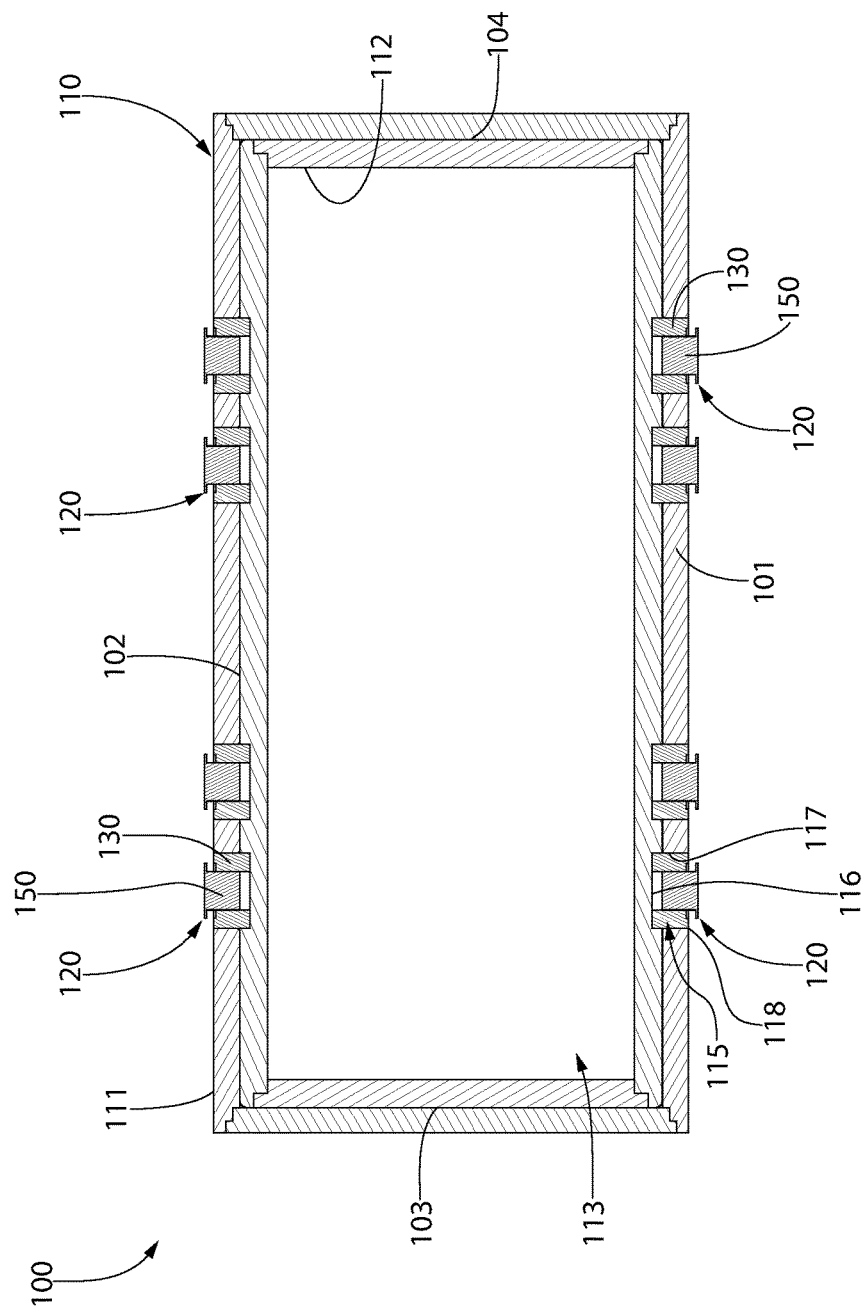
FIG. 5 is a cross-sectional view taken along line V-V of FIG. 4.
Figure 6:
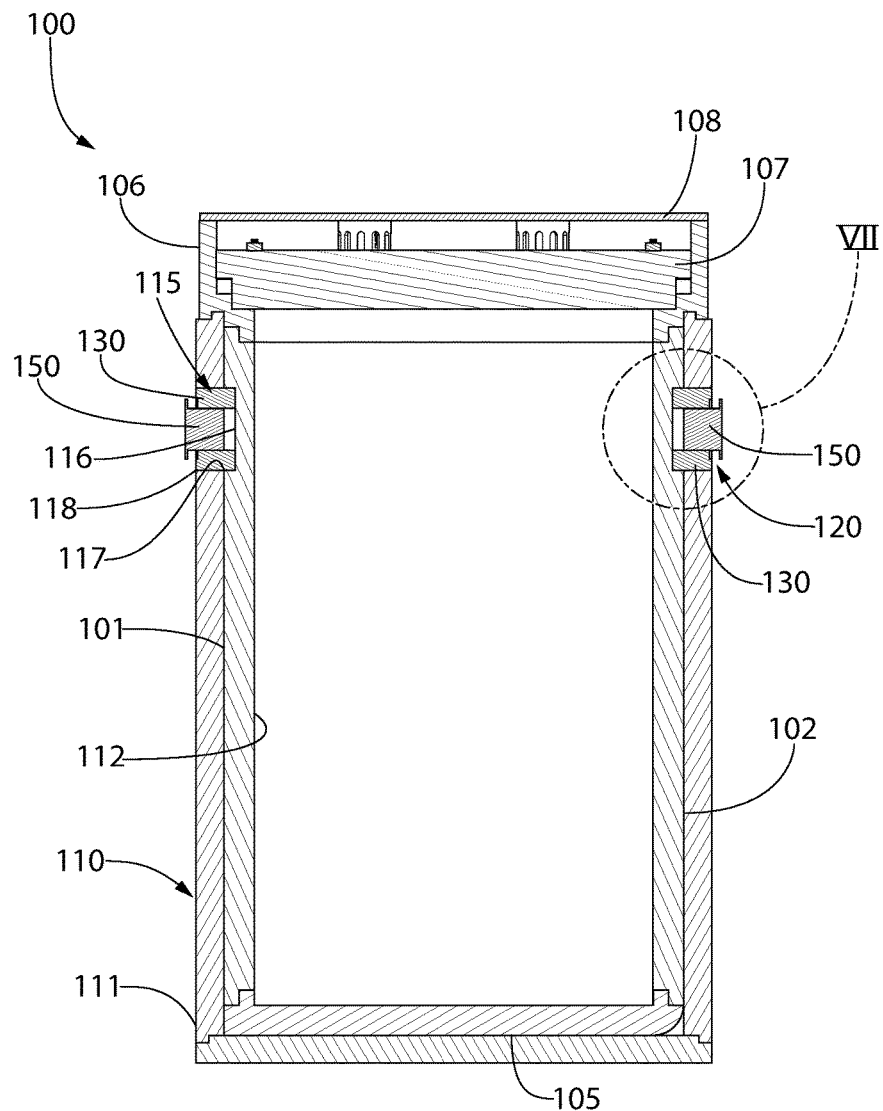
FIG. 6 is a cross-sectional view taken along line VI-VI of FIG. 4.

Still referring to FIGS. 5-7A concurrently, the trunnions 120 will be described in greater detail in accordance with an exemplary embodiment. FIGS. 5 and 6 illustrate different cross-sectional views of the container 100 that illustrate the structural details of the each of the trunnions 120 and FIG. 7A illustrates a close-up view of one of the trunnions 120 in cross-section. Due to the enlarged size of the trunnion 120 in FIG. 7A, some of the reference numerals used below to describe the structure and function of the trunnion 120 may only be provided in FIG. 7A for clarity and to avoid clutter. However, the features referred to by these reference numerals are also illustrated in FIGS. 5 and 6 and thus those figures can be viewed in conjunction with FIG. 7A to gain a full understanding and appreciation of the teachings set forth herein.

In the exemplified embodiment, each of the trunnions 120 has the same structure and thus the description below will be made with regard to one of the trunnions 120, it being understood that the description is applicable to each trunnion 120. Of course, in other embodiments some of the trunnions 120 may have a structure different than that which is shown in the drawings and described herein. For example, some of the trunnions 120 may be collapsible as described herein and others may be of a more conventional type that are detachable from the body 110 via a threaded connection or the like. Additionally or alternatively, some of the trunnions may be of the type that are welded directly to the body 110 and not detachable therefrom or collapsible. Of course, it may be preferable in some embodiments for each of the trunnions 120 to be collapsible.

In the exemplified embodiment, the trunnions 120 have a two-part structure comprising a first component 130 and a second component 150. As will be discussed in greater detail below, in some embodiments the first component 130 may be omitted and the trunnions 120 may have a one-part structure without changing the function described herein. In the exemplified embodiment, both the first and second components 130, 150 are formed of a metal such as stainless steel, although other metals and metal alloys may be used in other embodiments. The first component 130 extends from a first end 131 to a second end 132 and has an outer surface 133 and an inner surface 134. The inner surface 134 is smooth and free of bumps, ridges, protuberances or the like and defines a hollow interior 135. In the exemplified embodiment, the hollow interior 135 is open at both the first and second ends 131, 132 and thus the hollow interior 135 forms a passageway through the first component 130 from the first end 131 to the second end 132. However, the invention is not to be so limited in all embodiments and the first end 131 of the first component 130 may be closed while an opening remains in the second end 132 of the first component 130.

The first component 130 is positioned within one of the blind holes 115 so that the first end 131 of the first component 130 is in contact with the floor 116 of the blind hole 115 and the outer surface 133 is in contact with the sidewall 117 of the blind hole 115. The outer diameter of the first component 130 and the diameter of the blind hole 115 may be selected to ensure that the first component 130 fits snugly within the blind hole 115 so that it can not be readily removed from the blind hole 115 once positioned therein. In some embodiments, the first component 130 may be welded to the body 110 to strengthen the attachment between the first component 130 and the body 110. For example, an annular weld joint may be formed at the location where the inner surface 134 of the first component 130 meets the floor 116 of the blind hole 115. Alternatively, an annular weld joint may be formed at the location where the second end 132 of the first component 130 meets the outer surface 111 of the body 110. The connection between the first component 130 and the body 110 may be further reinforced by radial gussets extending between the inner surface 134 of the first component 130 and the floor 116 of the blind hole 115. In certain embodiments, the first component 130 remains fixed to the body 110 regardless of whether the trunnion 120 is in the protruded or retracted states.

The second end 132 of the first component 130 comprises a first portion 136 and a second portion 137. The first portion 137 of the second end 132 of the first component 130 is flush with the outer surface 111 of the body 110 when the first component 130 is inserted into the blind hole 115 as illustrated. The second portion 137 of the second end 132 of the first component 130 is recessed relative to the first portion 136 and recessed relative to the outer surface 111 of the body 110 when the first component 130 is inserted into the blind hole 115 as illustrated. Thus, the second end 132 of the first component 130 has a stepped surface. The second portion 137 of the second end 132 of the first component 130 forms a nesting groove 138 in the second end 132 of the first component 130 within which a portion of the second component 150 may nest when in the retracted state as described in more detail below with reference to FIG. 7B.

In the exemplified embodiment, the second portion 137 of the second end 132 of the first component 130 is annular or ring-like in shape and the first portion 136 of the second end 132 of the first component 130 surrounds the second portion 137 of the second end 132 of the first component 130. Of course, the invention is not to be limited by the stepped surface of the second end 132 of the first component 130 as illustrated and the second end 132 of the first component 130 may be flat or planar rather than stepped in other embodiments. Although the first portion 136 of the second end 132 of the first component 130 is illustrated as being flush with the outer surface 111 of the body 110 in the exemplified embodiment, it may be recessed relative to the outer surface 111 of the body 110 in other embodiments.

While the first component 130 of the trunnion 120 is a hollow structure, the second component 150 of the trunnion 120 is a solid structure extending from a first end 151 to a second end 152 along a longitudinal axis C-C. Although illustrated as being an entirely solid body, the second component 150 may have an internal cavity in other embodiments to reduce material costs so long as it does not detract from the ability 150 of the second component 150 to support the weight of the container 100. Specifically, during maneuvering of the container 100, the hooks of the lift yoke are coupled to the second component 150 of the trunnion 120. Thus, the second component 150 of the trunnion 120 must be sufficiently rigid and strong to support the entire weight of the container 100 without bending or breaking. Forming the second component 150 from solid steel is therefore preferable.

The second component 150 is positioned at least partially within the hollow interior 135 of the first component 130 and protrudes from the outer surface 111 of the body 110. In that regard, the second component 150 has an outer surface 153 that may be in direct contact with the inner surface 134 of the first component 130. The second component 150 may be coupled to the first component 130 via a seal weld (i.e., a fillet weld) in some embodiments. In such an embodiment, the weld will create an axial load retention that will prevent the second component 150 from sliding in its axial direction (i.e., in the direction of the longitudinal axis C-C) until a force is applied onto the second component 150 that causes the weld to break. Thus, the weld provides the trunnion 120, and more specifically the second component 150 of the trunnion 120, with a limited axial load bearing capacity such that an axial load up to a predetermined threshold will not break the weld and cause the second component 150 to slide axially. However, a force that breaks the weld will enable the second component 150 to slide axially relative to the first component 130. The container 100 tipping over and falling on the trunnion 120 would create a sufficient force to break the weld.

In other embodiments, the second component 150 may be shrunk-fit in the hollow interior 135 of the first component 130. Specifically, the second component 150 may be shrunk by cooling the second component 150 and then inserting the cooled/shrunk second component 150 into the hollow interior 135 of the first component 130. Then, when the second component 150 returns to its normal temperature, the second component 150 will expand back to its original size. This expansion will cause the second component 150 to be tight-fit within the hollow interior 135 of the first component 130. As a result, the outer surface 153 of the second component 150 will be in intimate surface contact with the inner surface 134 of the first component, thereby creating an interface pressure between the first and second components 130, 150. This interface pressure will provide the trunnion 120, and more specifically the second component 150 of the trunnion, with a limited axial load bearing capacity such that an axial load up to a predetermined threshold will not cause the second component 150 to slide axially due to the interface pressure between the first and second components 130, 150. However, a force greater than the predetermined threshold will enable the second component 150 to slide axially relative to the first component 130. Again, the container 100 tipping over and falling on the trunnion 120 would create a sufficient force to overcome the interface pressure and cause the second component 150 of the trunnion 120 to slide axially into the hollow interior 135 of the first component 130. In some embodiments, the second component 150 may be welded to the first component 130 and shrunk-fit in the hollow interior 135 of the first component 130.

The second component 150 is positioned within the hollow interior 135 of the first component 130 so that the first end 151 of the second component 150 is spaced apart from the floor 116 of the blind hole 115 by a gap 155. Furthermore, the second component 150 has a first portion 156 that is located within the hollow interior 135 of the first component 130 and a second portion 157 that protrudes from the outer surface 111 of the body 110. The lift yoke is able to hook onto the protruding portion of the second component 150 during lifting/maneuvering of the container 100. Thus, in order to move the container 100 via engagement between the lift yoke and the trunnions 120, the second component 150 must protrude from the outer surface 111 of the body 110 to provide an engagement shoulder for the lift yoke. The gap 155 has a length measured from the floor 116 of the blind hole 115 to the first end 151 of the second component 150 and the second portion 157 of the second component 130 has a length measured along the longitudinal axis C-C of the second component 150 such that the length of the gap 155 is equal to or greater than the length of the second portion 157 of the second component 150. The gap 155 having an equal or greater length than the second portion 157 of the second component 150 (i.e., the portion of the second component 150 that protrudes from the outer surface 111 of the body 110 when the trunnion 120 is in the protruded state) enables the second component 150 to slide into the gap 155 during a collapsing procedure a sufficient amount so that the second portion 157 of the second component 150 no longer protrudes from the outer surface 111 of the body 110.

The second component 150 comprises a body portion 160 and a flange portion 161 extending radially from the body portion 160 at the second end 152 of the second component 150. When the lift yoke is being used, the hooks of the lift yoke become trapped between the flange portion 161 of the second component 150 and the outer surface 111 of the body 110 of the container (or the second end 132 of the first component 130). The flange portion 161 prevents the hook of the lift yoke from readily sliding off the trunnion 120 during a moving operation.

Figure 7A:
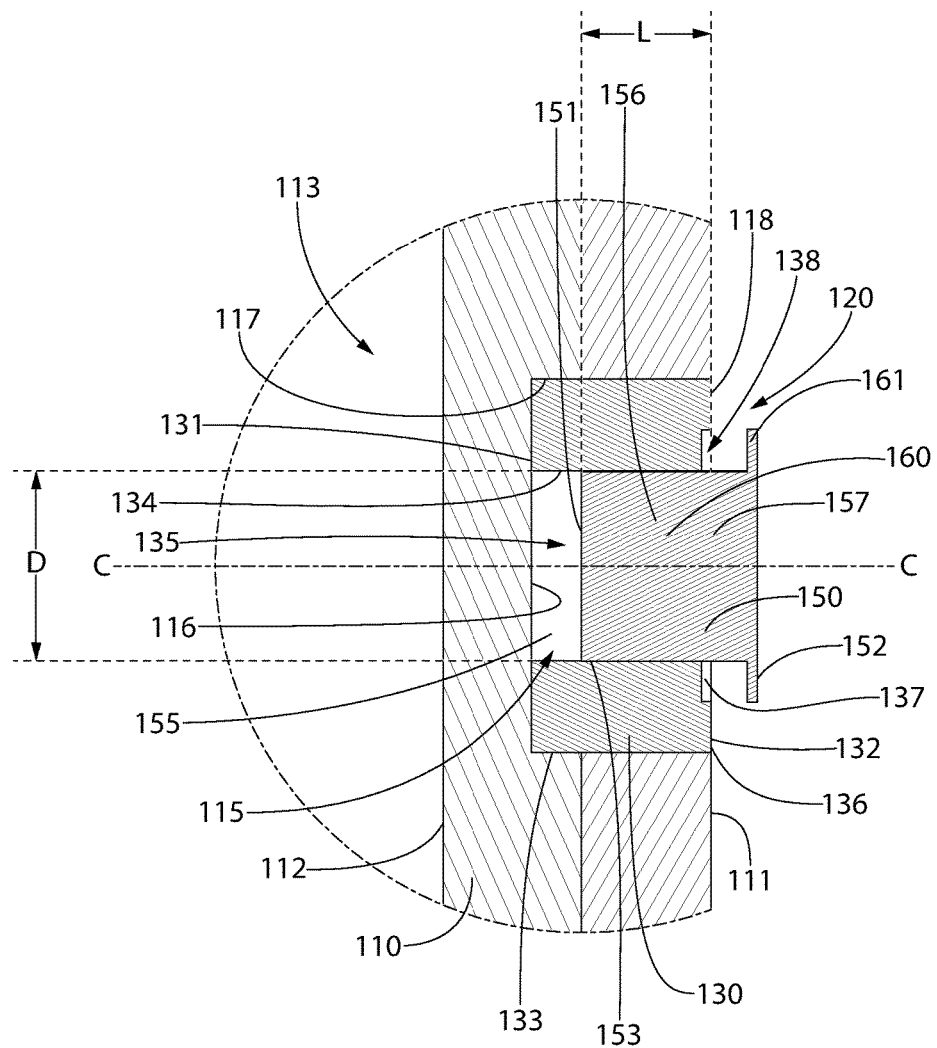
FIG. 7A is a close-up of area VII of FIG. 6 illustrating a trunnion of the container in a protruded state.
Figure 7B:
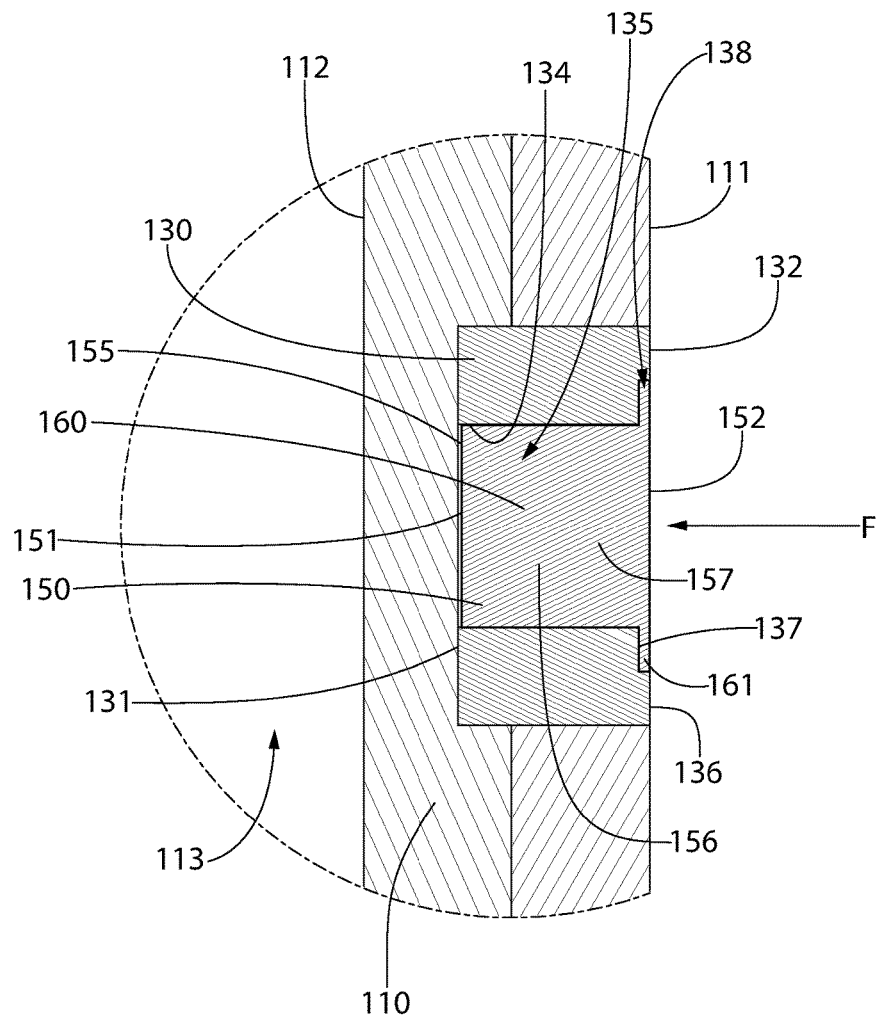
FIG. 7B is a close-up of area VII of FIG. 6 illustrating the trunnion of the container in a retracted state.

Referring to FIGS. 7A and 7B concurrently, the collapsible nature of the trunnion 120 will be described. Due in part to the fact that the second component 150 is located within the hollow cavity 135 of the first component 130 in a spaced apart manner from the floor 116 of the blind hole 115, when a sufficient axial force is applied onto the second component 150 towards the internal cavity 113 of the body 110, the second component 150 can slide axially relative to the first component 130 into the gap 155. The only things hindering free axial movement of the first component 130 into the gap 155 are the possible weld joint coupling the first and second components 130, 150 together and the possible interface pressure between the inner surface 134 of the first component 130 and the outer surface 153 of the second component 150. However, if a force acts on the second component 150 that overcomes the weld joint and/or the interface pressure, the second component 150 will slide axially into the gap 155.

Thus, the second component 150 of the trunnion 120 is axially slidable relative to the first component 130 of the trunnion 120 between a protruded state (FIG. 7A) in which the second portion 157 of the second component 150 protrudes from the outer surface 111 of the body 110 and a retracted state (FIG. 7B) in which the second component 150 does not protrude from the outer surface 111 of the body 110. In the exemplified embodiment, in the protruded state the first portion 156 of the second component 150 is located within the hollow interior 135 of the first component 130 and the second portion 157 of the second component 150 protrudes from the hollow interior 135 of the first component 130. Stated another way, in the protruded state the first portion 156 of the second component 150 is located within the blind hole 115 and the second portion 157 of the second component 150 protrudes from the outer surface 111 of the body 110. Furthermore, in the exemplified embodiment, in the retracted state the first and second portions 156, 157 of the second component 150 are both located within the hollow interior 135 of the first component 130 such that no part of the second component 150 protrudes out of the hollow interior 135 and from the outer surface 111 of the body 110. Stated another way, in the retracted state the first and second portions 156, 157 of the second component 150 are both located within the blind hole 115. Thus, in both the protruded and retracted states, at least a portion of the second component 150 of the trunnion 120 is located within the blind hole 115.

As has been described above, sliding the second component 150 from the protruded state to the retracted state occurs when a sufficient axial force F (i.e., one that is greater than the axial load retention capacity of the second component 150 relative to the first component 130) acts upon the second component 150. This axial force F causes the second component 150 to slide axially relative to the first component 130 (and relative to the body 110) into the gap 155.

When the second component 150 is in the retracted state, the flange portion 161 of the second component 150 nests within the nesting groove 138 formed by the first and second portions 136, 137 of the second end 132 of the first component 130. Both the nesting groove 138 and the flange portion 161 may be annular shaped in some embodiments. As a result, when the second component 150 is in the retracted state, the second end 152 of the second component 150 is flush with the outer surface 111 of the body 110. Of course, in other embodiments in the retracted state the second end 152 of the second component 150 may be recessed relative to the outer surface 111 of the body 110. This can be dictated by the length of the blind hole 115 and the length of the second component 150 of the trunnion 120.

During normal use of the container 100, the second component 150 of the trunnion 120 is in the protruded state such that it can be used at any time for movement of the container 100. In order to ensure that the second component 150 is sufficiently strong to enable it to support the weight of the container 100, it is desirable for an adequate amount of the second component 150 to be located within the hollow interior 135 of the first component 130. Stated another way, the second component 150 is configured to project sufficiently inside the first component 130 such that it develops the full stiffness of a cantilevered beam with the first component 130 serving as the anchor of the cantilever.

In that regard, the first portion 156 of the second component 150 (which is the portion located within the hollow interior 135 of the second component 130) has a length L and a diameter D. A ratio of the diameter D to the length L is between 1:1 and 2:1. Thus, a length of the second component 150 equal to between ½ and 1.0 of the diameter D of the second component 150 is located within the hollow interior 135 of the first component 130 when the second component 150 is in the protruded state. In the exemplified embodiment, when the second component 150 is in the protruded state at least two-thirds of the length of the second component 150 measured from the first end 151 to the second end 152 is located within the hollow interior 135 of the first component 130 (and also within the blind hole 115). Thus, a ratio of the length of the first portion 156 of the second component 150 to the length of the second portion 157 of the second component is between 2:1 and 3:1 in some embodiments, and more specifically approximately 2.5:1. The collapsible trunnion 120 configured in this manner will have a limited axial load bearing capacity without any reduction in its load bearing capacity which derives from its bending rigidity, which is not impaired by the reduction in its axial load sustaining capacity. The collapsible trunnion 120 is a structurally competent member in bending but a relatively weak member in axial tension or compression.

In order to facilitate the axial sliding of the second component 150 relative to the first component 130, the outer surface 153 of the second component 150 and the inner surface 134 of the first component 130 are preferably smooth and without ridges, protuberances, or the like. Furthermore, although in the exemplified embodiment the trunnion 120 is illustrated and described as including both of the first and second components 130, 150, in some alternative embodiments the first component 130 may be omitted. In such an embodiment, the portions of the trunnion 120 illustrated as forming the first component 130 will instead be formed directly by the body 110 of the container 100 and the second component 150 will form the entirety of the trunnion 120. Thus, as used herein "trunnion" may refer to the combination of the first and second components 130, 150 or just the second component 150. In embodiments that omit the first component 130, the second component 150 may be positioned in intimate surface contact with the sidewall 117 of the blind hole 115 so as to be axially slidable relative to the body 110 in the manner described herein. Thus, the first component 130 serves as an intermediary between the body 110 and the second component 150 in the exemplified embodiment, but it may not be required in all embodiments.

In some embodiments the trunnion 120 may collapse rather than slide axially. Thus, the trunnion 120 may be configured to collapse upon itself. Furthermore, in some embodiments the trunnion 120 may be collapsible between a non-collapsed state and a collapsed state such that in the non-collapsed state the trunnion 120 protrudes a greater distance from the outer surface 111 of the body 110 than in the collapsed state. Thus, the trunnion 120 may protrude a first distance from the outer surface 111 of the body 110 in the non-collapsed state and a second distance from the outer surface 111 of the body 110 in the collapsed state, the first distance being greater than the second distance. In some embodiments the second distance may be zero, or may be negative whereby the trunnion 120 is recessed relative to the outer surface 111 of the body 110 in the collapsed state.

Thus, the non-collapsed state may be equivalent or similar to the protruded state described above and the collapsed state may be equivalent or similar to the retracted state described above. Furthermore, the non-collapsed state and the protruded state may be referred to herein as a first state and the collapsed state and the retracted state may be referred to herein as a second state.

Figure 8:
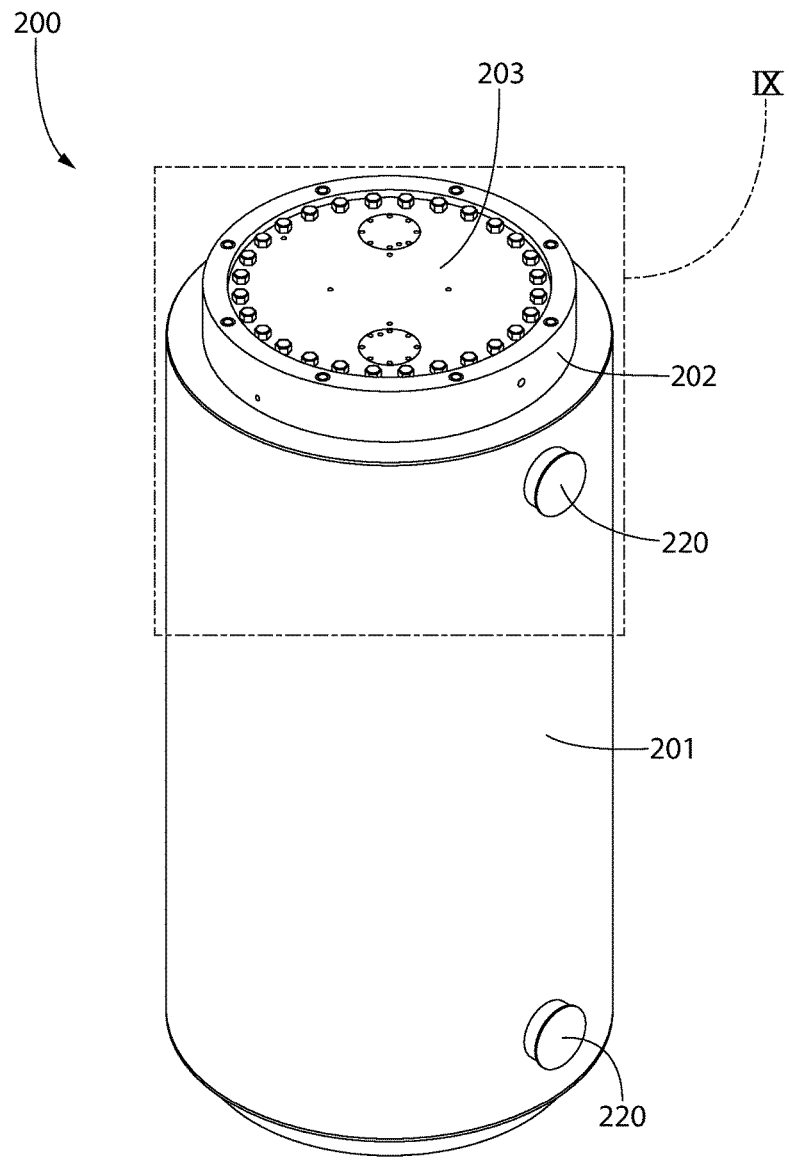
FIG. 8 is a perspective view of a container for storing and/or transporting spent nuclear fuel in accordance with another embodiment of the present invention.
Figure 9:
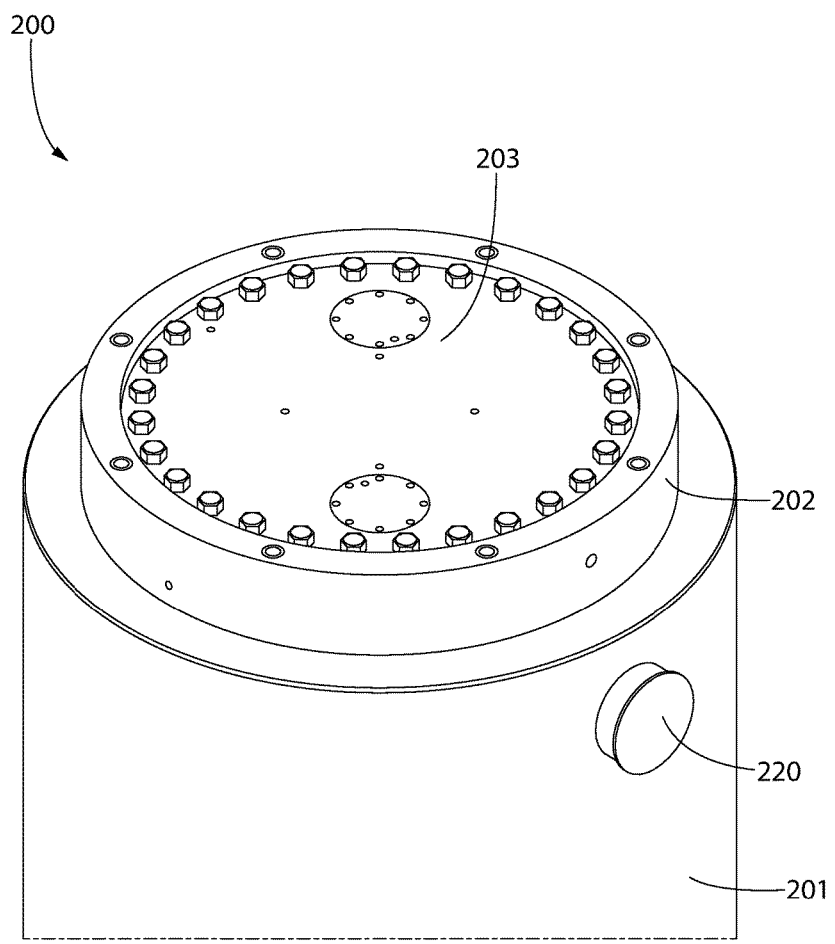
FIG. 9 is a close-up view of area IX of FIG. 8.

Referring to FIGS. 8-10, an alternate embodiment of a container 200 is illustrated in accordance with an embodiment of the present invention. The container 200 is cylindrical in shape and defines a cylindrical shaped cavity for storing spent nuclear fuel. The container 200 has a body portion 201 and a lid flange 202 extending from the body portion 201. The lid flange 202 has a smaller diameter than the body portion 201 as shown. A lid 203 is coupled to the lid flange 202. Furthermore, a plurality of trunnions 220 are coupled to the body portion 201 of the container 200. The trunnions 220 are identical to the trunnions 120 described above and thus a detailed description of their structure and function will not be described herein. Rather, the description of the trunnions 120 above is applicable to the trunnions 220.

FIG. 10 illustrates the container 200 with a lift yoke 250 coupled thereto in preparation for moving the container 200. Thus, the lift yoke 250 has a first hook arm 251 and a second hook arm 252. The first hook arm 251 engages a first one of the trunnions 220 and the second hook arm 252 engages a second one of the trunnions 220. In that regard, in the exemplified embodiment the first and second ones of the trunnions 220 are spaced apart by approximately 180° about the circumference of the cylindrical body 201 of the container 200. The purpose of FIGS. 8-10 is to illustrate that trunnions of the type described herein can be used with containers of varying shapes and having varying shaped cavities.

Referring briefly to FIGS. 1 and 3, in the exemplified embodiment the container 100 also includes a lifting lug 180 coupled to the lid 107. The lifting lug 180 is the structural component of the container 100 that facilitates coupling of the lid 107 to the body 110 of the container 100. Specifically, a crane can be operably coupled to the lifting lug 180 to lift the lid 107 off from the body 110 or place the lid 107 onto the body 110.

Figure 11:
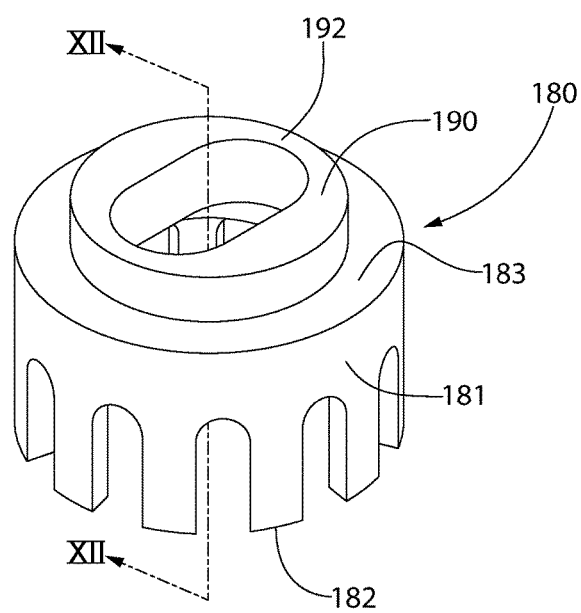
FIG. 11 is a close-up view of a lifting lug of the container of FIG. 1.
Figure 12A:
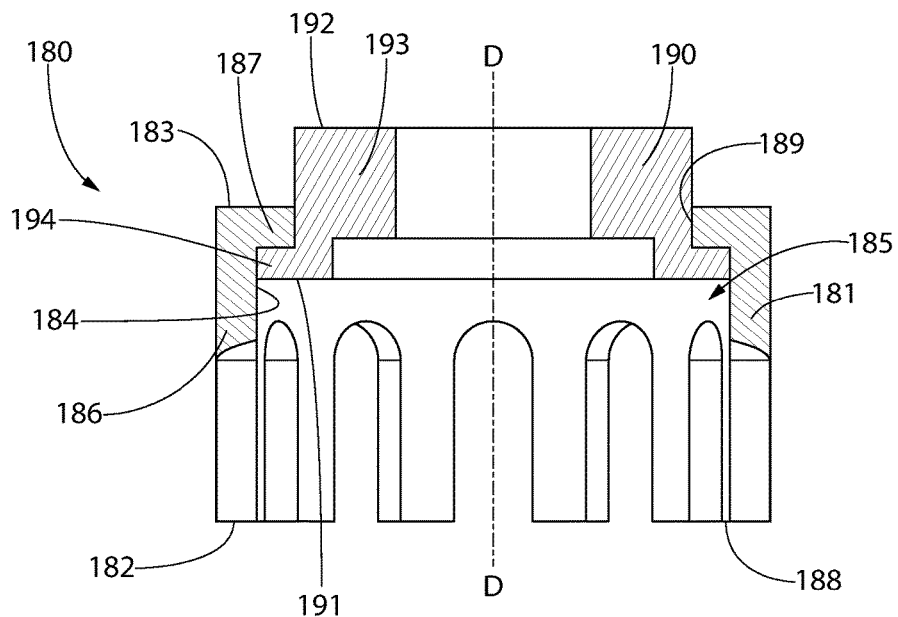
FIG. 12A is a cross-sectional view taken along line XII-XII of FIG. 11 with a second component of the lifting lug in a protruded state.
Figure 12B:
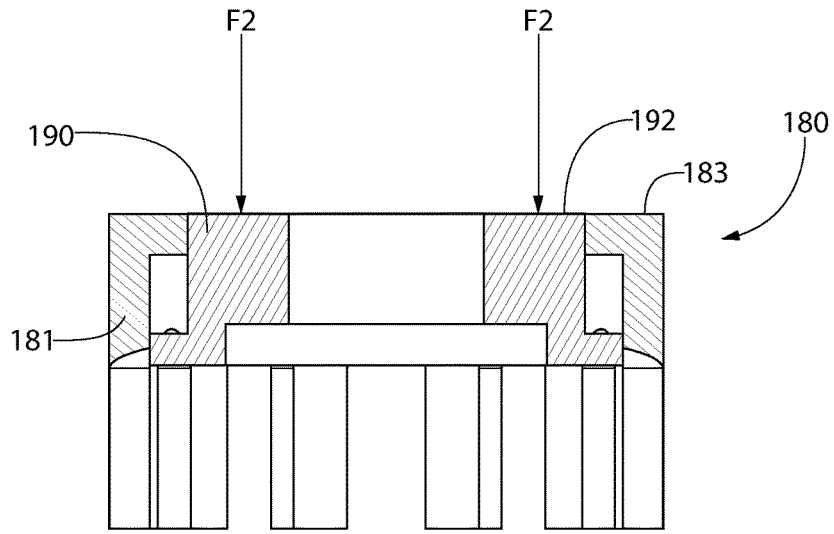
FIG. 12B is a cross-sectional view taken along line XII-XII of FIG. 11 with the second component of the lifting lug in a retracted state.

Referring now to FIGS. 11 and 12A, the lifting lug 180 is illustrated by itself and in cross section, respectively. The lifting lug 180 comprises a first component 181 and a second component 190. Similar to the concepts described above with regard to the trunnions 120, in this embodiment the second component 190 is axially slidable relative to the first component 181. In that regard, the first component 181 of the lifting lug 180 is coupled to the lid 107 and the second component 190 of the lifting lug 180 is coupled to the first component 181 in a manner that permits the second component 190 to axially slide relative to the first component. The second component 190 has a high tensile load bearing capability so that it can support the weight of the lid 107 without breaking while having a low compression load bearing capability such that if a force F2 (FIG. 12B) is applied onto the second component 190 it will cause the second component 190 to slide axially as described further herein below.

The first component 181 of the lifting lug 180 protrudes from a top surface of the lid 107 and extends from a first end 182 to a second end 183. The first component 181 also has an inner surface 184 that defines a hollow interior 185. The first component 181 comprises a body portion 186 and a flange portion 187 extending from a top end of the body portion 186 inwardly towards the hollow interior 185. The first end 182 of the first component 180 defines a first opening 188 having a first cross-sectional area and the flange portion 187 defines a second opening 189 having a second cross-sectional area, the first cross-sectional area being greater than the second cross-sectional area.

The second component 190 is coupled to the first component 181 and extends from a first end 191 to a second end 192 along a longitudinal axis D-D. The second component 190 is axially slidable between a protruded state illustrated in FIG. 12A and a retracted state illustrated in FIG. 12B. Specifically, in the protruded state a first portion of the second component 190 is located within the hollow interior 185 of the first component 181 and a second portion of the second component 190 protrudes from the second end 183 of the first component 181. Upon application of a sufficient downward or compression force, the second component 190 will axially slide relative to the first component 181 form the protruded state into the retracted state illustrated in FIG. 12B.

As shown in FIG. 12A, the second component 190 has a body portion 193 and a flange portion 194 extending from the body portion 193 in a direction away from the outer surface of the body portion 193. When the second component 190 is located within the hollow interior 185 of the first component 181, the flange portion 194 of the second component 190 engages the flange portion 187 of the first component 181 so that a tensile load coupled to the second component 190 will not separate the second component 190 from the first component 181.

Moreover, the body portion 193 of the second component 190 has a third cross-sectional area and the flange portion 194 of the second component 190 has a fourth cross-sectional area that is greater than the third cross-sectional area. Furthermore, the fourth cross-sectional area is equal to or less than the first cross-sectional area of the first opening 188 and is greater than the second cross-sectional area of the second opening 189. Thus, the second component 190 can be inserted into the hollow interior 185 of the first component 181 through the first opening 188 in the first end 182 but not through the second opening 189 in the second end 183 because the flange portion 194 will not fit through the second opening 189. This difference in cross-sectional areas of the various regions of the first and second components 181, 190 also maintains the coupling of the first and second components 181, 190 when the second component is carrying a tensile load.

Thus, the flange portions 187, 194 of the first and second components 181, 190 of the lifting lug 180 interact to prevent the second component 190 from sliding relative to the first component 181 in a first axial direction. However, a compression force acting on the second component 190 will cause the second component 190 to axially slide relative to the first component 181 in a second axial direction, which is inwardly into the hollow interior 185 of the first component 180. The second component 190 may be capable of being axially slid relative to the first component 181 until the second end 192 of the second component 190 is flush with or recessed relative to the second end 183 of the first component 181.

Although described herein as it relates to the lid of a nuclear storage container, the lifting lug 180 described herein can be used for other applications. Specifically, lifting lugs are generally used by serving as a robust tension member and they have uses outside of the nuclear storage industry for lifting a wide variety of apparatuses and equipment. Thus, the lifting lugs 180 described herein with a retractability feature may be used in any instance in which a lifting lug is desired. In that regard, in some embodiments the invention may be directed to the lifting lug 180 itself without regard to its specific application or the specific device to which it is coupled.

Thus, the trunnion 120, 220 and lifting lug 180 designs described herein and illustrated in the drawings rely on the concept of direction-dependent stiffness that is engineered into the structure of the component. Specifically, the trunnions 120, 220 can carry a heavy load in a direction perpendicular to their axes but a load or force applied axially will cause the trunnions 120, 220 to collapse as described herein. Thus, the trunnions 120, 220 are a structurally competent member in bending but a weak one in axial tension or compression, which facilitates the collapsible functionality described herein. Similarly, the lifting lug 180 can carry a heavy tensile load, but a compression load will cause the lifting lug 180 to collapse as described herein. The term lifting device may be used herein to refer to either the lifting lug 180 or the trunnion 120, 220.

There may be applications where the linear member is required to have a modest load carrying capacity in tension or compression but an assured-to-fail configuration if the applied load is large. For example, fasteners used to support a mattress of crushable material used to serve as an impact mitigator can be made of calibrated axial load carrying capacity to enable an efficient impact limited design.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A container for storing and/or transporting spent nuclear fuel comprising:
    a body having an outer surface and an inner surface defining an internal cavity;
    a plurality of blind holes formed into the body, each of the blind holes defined by a floor and a sidewall extending from the floor to an opening in the outer surface of the body;
    a plurality of trunnions coupled to the body, each of the trunnions comprising:
        a first component located within one of the blind holes, the first component extending from a first end to a second end and having an inner surface defining a hollow interior; and
        a second component at least partially located within the hollow interior of the first component, the second component extending from a first end to a second end along a longitudinal axis; and
    wherein for each of the plurality of trunnions, the second component is axially slidable relative to the first component between: (1) a protruded state in which a portion of the second component protrudes from the outer surface of the body; and (2) a retracted state in which the second component does not protrude from the outer surface of the body.

2. The container according to claim 1 wherein for each of the plurality of trunnions, the second component is welded to the first component to provide the second component of the trunnion with a limited axial load bearing capacity.

3. The container according to claim 1 wherein for each of the plurality of trunnions, an outer surface of the second component is in surface contact with the inner surface of the first component thereby forming an interface pressure between the first and second components to provide the second component of the trunnion with a limited axial load bearing capacity.

4. The container according to claim 1 wherein for each of the plurality of trunnions, the second component comprises a body portion and a flange portion extending radially from the body portion at the second end of the second component, the portion of the second component that protrudes from the outer surface of the body in the protruded state comprising the flange portion.

5. The container according to claim 4 wherein for each of the plurality of trunnions, the second end of the first component comprises a first portion that is flush with the outer surface of the body and a second portion that is recessed relative to the outer surface of the body thereby forming a nesting groove in the second end of the first component, and wherein when the second component is in the retracted state the flange portion of the second component nests within the nesting groove of the first component and is flush with the first portion of the second end of the first component and the outer surface of the body.

6. The container according to claim 1 wherein for each of the plurality of trunnions, the first end of the first component is in surface contact with the floor of the blind hole, an outer surface of the first component is in surface contact with the sidewall of the blind hole, and the second end of the first component is flush with the outer surface of the body.

7. The container according to claim 1 wherein the second component of each of the plurality of trunnions has an axial load bearing capacity and wherein the second component moves from the protruded state into the retracted state when an axial force greater than the axial load bearing capacity is applied to the second end of the second component in a direction towards the body.

8. The container according to claim 1 wherein for each of the plurality of trunnions, in the protruded state a first portion of the second component is located within the hollow interior of the first component and a second portion of the second component protrudes from the hollow interior of the first component, and wherein in the retracted state both of the first and second portions of the second component are located within the hollow interior of the first component.

9. The container according to claim 1 wherein for each of the plurality of trunnions, an entirety of the first component is located within the blind hole with the second end of the first component either flush with or recessed relative to the outer surface of the body when the second component is in both the protruded and retracted states.

10. The container according to claim 1 wherein for each of the plurality of trunnions, in the protruded state the first end of the second component is spaced apart from the floor of the blind hole by a gap and in the retracted state the first end of the second component moves into the gap.

11. The container according to claim 10 wherein axially sliding the second component from the protruded state to the retracted state comprises sliding the second component relative to the first component towards the body in a direction of the longitudinal axis of the second component.

12. The container according to claim 1 wherein in the protruded state, a portion of the second component that is located within the hollow interior of the first component has a length and a diameter, a ratio of the diameter to the length being between 1:1 and 2:1.

13. The container according to claim 1 wherein the second component has a length measured from the first end to the second end, and wherein when the second component is in the protruded state at least two-thirds of the length of the second component is located within the hollow interior of the first component.

14. The container according to claim 1 wherein in the retracted state the second end of the second component is flush with the outer surface of the body.

15. A container for storing and/or transporting spent nuclear fuel comprising:
 a body having an outer surface and an inner surface defining an internal cavity configured to hold spent nuclear fuel;
 a hole formed into the body, the hole defined by a floor and a sidewall extending from the floor to an opening in the outer surface of the body;
 a trunnion at least partially located within the hole, the trunnion comprising:
  a first component welded to the body within the hole, the first component having a first end that is in contact with the floor of the hole, a second end that is flush with or recessed relative to the outer surface of the body, an outer surface that is in contact with the sidewall of the hole, and an inner surface that defines a hollow interior; and
  a second component located within the hollow interior of the first component, the second component extending from a first end to a second end along a longitudinal axis, the second component comprising a first portion that is located within the hollow interior of the first component and spaced from the floor of the hole by a gap and a second portion that protrudes from the outer surface of the body; and
 wherein upon application of an axial force that exceeds a predetermined threshold onto the second end of the second component, the second component slides relative to the first component in an axial direction into the gap.

16. The container according to claim 15 wherein the second component is welded to the first component and wherein the axial force is sufficient to break the weld between the first and second components to permit the second component to slide relative to the first component.

17. The container according to claim 15 wherein an outer surface of the second component is in surface contact with the inner surface of the first component thereby creating an interface pressure between the first and second components that prevents the second component from sliding relative to the first component until the axial force that exceeds the predetermined threshold is applied to the second end of the second component.

18. The container according to claim 15 wherein upon application of the axial force, the second component slides in the axial direction until the second end of the second component is flush with the outer surface of the body.

19. The container according to claim 15 wherein upon application of the axial force, the second component slides in the axial direction until a flange at the second end of the second component abuts the second end of the first component.

20. A container for storing and/or transporting spent nuclear fuel comprising:

a body having an outer surface and an inner surface defining an internal cavity;

a plurality of blind holes formed into the body, each of the blind holes defined by a floor and a sidewall extending from the floor to an opening in the outer surface of the body;

a plurality of trunnions, each of the trunnions located within one of the blind holes and extending from a first end to a second end along a longitudinal axis; and wherein at least one of the plurality of trunnions is axially slidable relative to the body between: (1) a protruded state in which a portion of the trunnion protrudes from the outer surface of the body; and (2) a retracted state in which the trunnion does not protrude from the outer surface of the body.

* * * * *